Nov. 18, 1924.

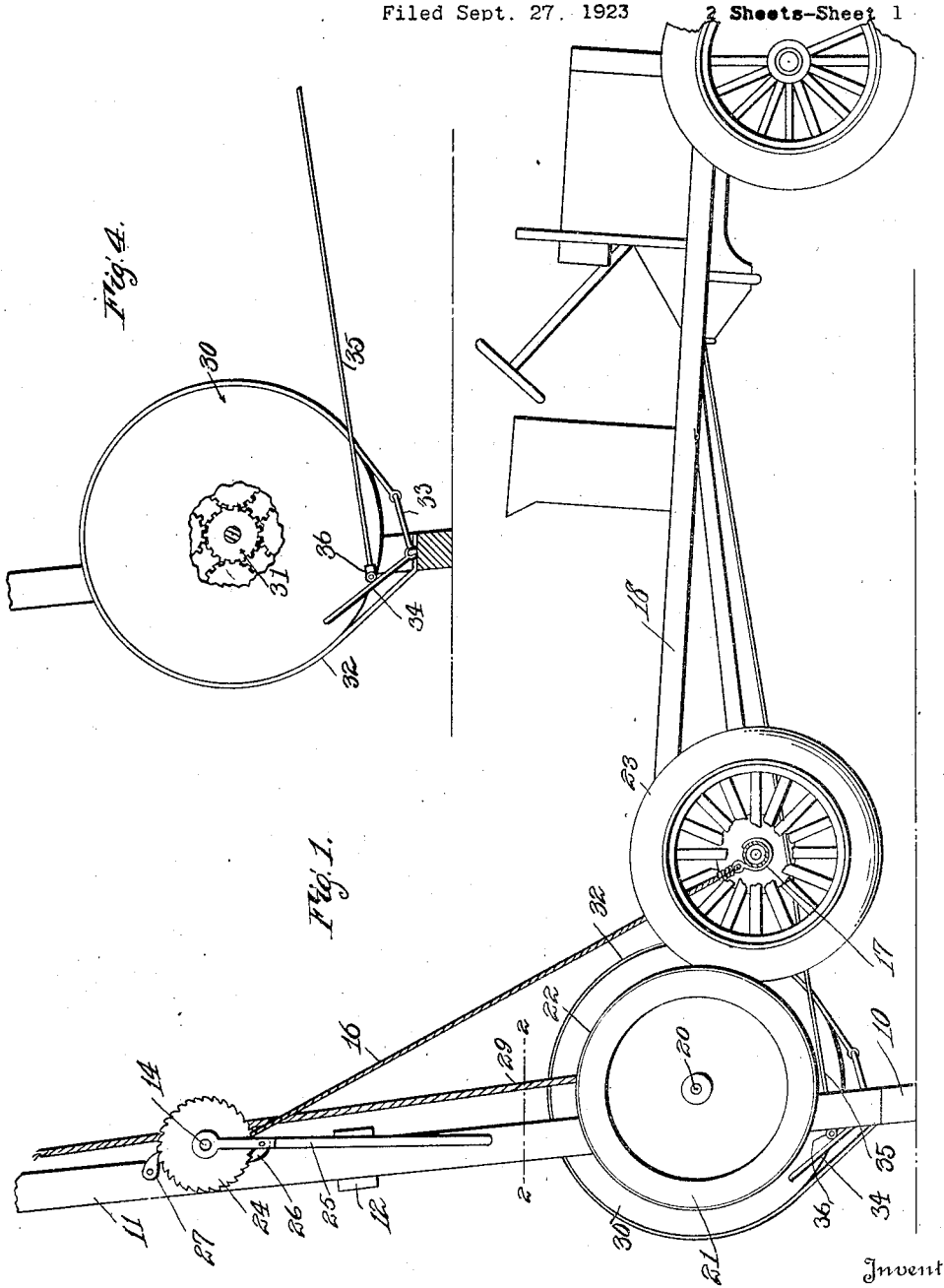

W. G. SCHROEDER ET AL 1,516,311

ROD AND TUBE FRICTION PULLING MACHINE

Filed Sept. 27, 1923  2 Sheets-Sheet 2

Inventor
William G. Schroeder
Clyde I. Layton.

Attorney

Patented Nov. 18, 1924.

1,516,311

UNITED STATES PATENT OFFICE.

WILLIAM G. SCHROEDER AND CLYDE I. LAYTON, OF DEWEY, OKLAHOMA.

ROD AND TUBE FRICTION PULLING MACHINE.

Application filed September 27, 1923. Serial No. 665,253.

*To all whom it may concern:*

Be it known that we, WILLIAM G. SCHROEDER and CLYDE I. LAYTON, citizens of the United States, residing at Dewey, in the county of Washington, State of Oklahoma, have invented certain new and useful Improvements in Rod and Tube Friction Pulling Machines; and we do hereby declare the following to be a full, clear, and exact description of the invention, such as will enable others skilled in the art to which it appertains to make and use the same.

This invention relates to new and useful improvements in pulling machines and particularly to machines for pulling rods and tubing from oil and gas wells.

One object of the invention is to provide a device of this character which is arranged to be operated by the drive wheels of an automobile, truck or tractor.

Another object is to provide novel and improved means for moving and maintaining the rear wheels of an automobile truck or tractor in proper contact with the pulling mechanism.

Other objects and advantages will be apparent from the following description when taken in connection with the accompanying drawings.

In the drawings:

Figure 1 is a side elevation of a portion of a well tube pulling mechanism showing the rear portion of an automobile associated therewith.

Figure 4 is a vertical longitudinal sectional view on the line 4—4 of Figure 3, showing the brake lever and the throttle rod.

Figure 3:
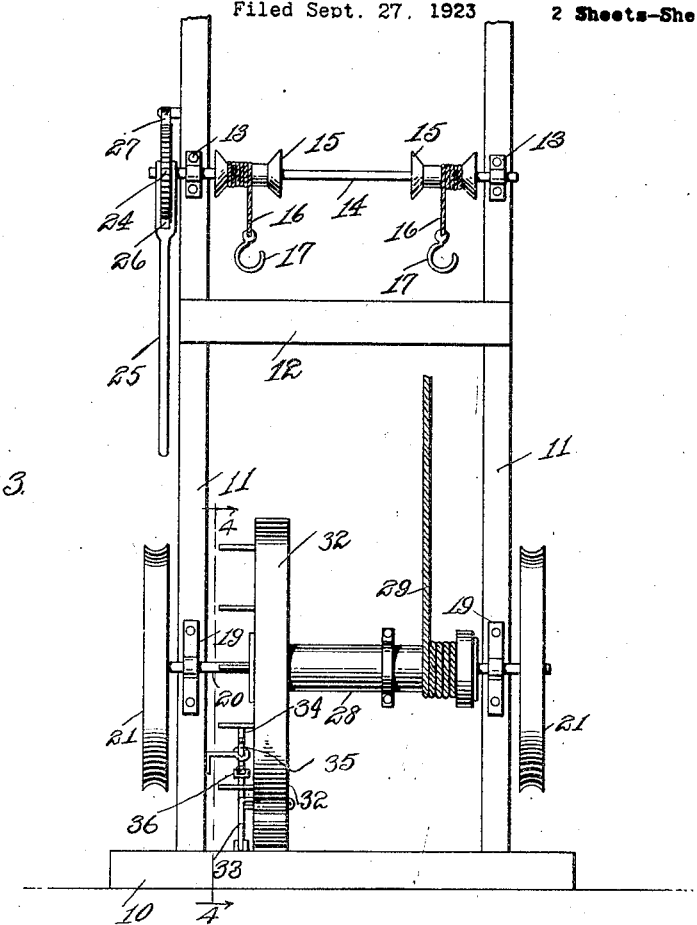
Figure 3 is a front elevation of the pulling machine, the automobile being removed.
Figure 2:
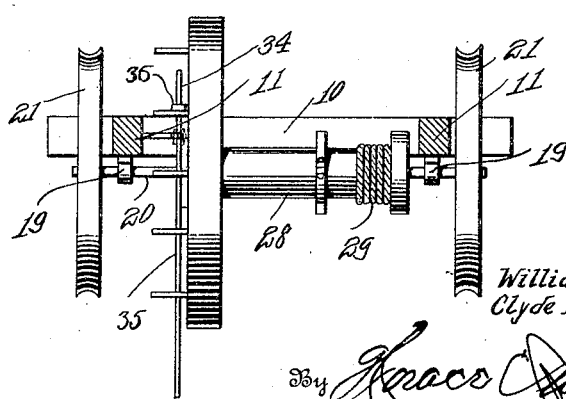
Figure 2 is a horizontal sectional view on the line 2—2 of Figure 1.

Referring particularly to the accompanying drawing, the mast of the pulling machine includes the base 10, on which are erected the uprights 11, connected together, at a suitable distance above the base, by the cross beam 12. Mounted on the uprights, at suitable distances above the ends of this beam 12, are the bearing brackets 13, and supported at its ends in these brackets is a shaft 14. Fixed on the shaft 14, inwardly of the uprights 11, are the spools or winding drums 15, and secured to and wound on these spools are the cables 16, each having on its free end a suitable hook 17, which is arranged to be engaged with the rear axle housing of the automobile 18. On the uprights 11, at a suitable distance above the base 10, are the bearing brackets 19, and supported in these brackets is a shaft 20, the ends of said shaft projecting from the sides of the uprights and having fixed thereon the peripherally grooved wheels 21. The grooves of the wheels 21 are lined with leather or other suitable friction material 22, and within these grooves are engaged the tires of the rear wheels 23, of the automobile. On one end of the upper shaft 14 there is fixed a ratchet wheel 24, and loosely rotatable on the shaft, adjacent the ratchet wheel, is a lever 25 carrying an operating pawl 26, which engages with the teeth of the wheel 24. A retaining pawl 27 is pivotally mounted on the upright 11, for engagement with the wheel 24 to retain the shaft against rotation, when desired. On the shaft 20, intermediate the uprights 11 is mounted a main pulling drum 28, and wound on the drum is the pulling cable 29, which extends upwardly over the upper end of the mast (not shown). Adjacent the drum 28, and supported on the shaft 20, is the brake drum 30, which is of the ordinary construction used in this type of pulling machines, and equipped with the planetary gears 31. Engaged around the brake drum 30 is the brake band 32, one end of which is secured to the base 10, while the other end is secured to the rocker 33, mounted on the base 10, and to which is connected the operating lever 34, whereby upon movement of the lever in one direction, the brake band will frictionally engage the drum 30 to hold the same from rotation, to permit the gears to rotate the winding drum 28, and movement in the other direction loosens the band and permits the drum 30 to run idly, without affecting the drum 28.

The automible truck or tractor is backed up to the mast, after which the operator draws the hooks 17 down and engages them with the rear axle housing of the automobile truck or tractor. The lever 25 is then grasped and rocked back and forth to cause the rotation of the shaft 14, so that the drums or spools 15 wind the cables 16, and pull the automobile toward the mast, until the rear wheels properly and frictionally engage in the grooves of the wheels 21. Further pulling of the cables 16 cause the automobile to be lifted from the ground so that the rear wheels bear, with great friction against the said wheels 21. Upon starting the motor of the automobile, the rear wheels will drive the shaft 20, and cause the operation of the cable 29, when the lever 34 is raised.

From the throttle of the automobile engine (not shown), there extends a rod 35, the same terminating adjacent the lever 34 in a transverse head 36, against which the said lever presses, when lifted to apply the brake band to the brake drum. This causes the movement of the rod 35, to open the throttle, and given the engine more fuel, so that the driving of the device is readily and effectively accomplished. Upon lowering the lever 34, to release the brake band, and permit the brake drum 30 to freely rotate, the throttle of the engine is released to permit the engine to run slowly, and without racing, it being understood that the shaft 20 is thus kept in motion, but very slowly.

What is claimed is:

1. In a well tube pulling machine, a mast, a drive shaft and brake means on the shaft, friction wheels on the shaft for operative engagement by the drive wheels of an automotive vehicle, and means on the mast for engagement with the rear axle of a vehicle for simultaneously lifting the vehicle and drawing the drive wheels thereof into firm contact with said friction wheels.

2. In a well tube pulling machine, a mast, a drive shaft on the mast having pulling means and grooved wheels thereon, said grooved wheels being arranged for frictional contact by the rear wheels of an automotive vehicle, a second shaft on the mast, drums on the second shaft, cables on the drums provided with means for engagement with the rear axle of a vehicle, and means for rotating the second shaft to lift the rear portion of the vehicle from the ground and engage the wheels thereof in the grooves of the grooved wheels.

3. In a well tube pulling machine, the combination with the drive and pulling shaft, of a brake band lever associated with the pulling machine, grooved wheels on the drive shaft for frictional contact of the rear wheels of an automotive vehicle, means on the mast for pulling the vehicle to lift the same from the ground and rest said rear wheels in the grooves of the grooved wheels, and a rod operatively connected with the throttle of the engine of the vehicle and having its other end arranged for engagement by the brake band lever to open the throttle when the brake band is applied.

In testimony whereof, we affix our signatures, in the presence of two witnesses:

WILLIAM G. SCHROEDER.
CLYDE I. LAYTON.

Witnesses:
CELIA A. HARPER,
FRED B. WOODARD.